United States Patent
Lee et al.

(10) Patent No.: US 9,650,509 B2
(45) Date of Patent: May 16, 2017

(54) POLYCARBONATE RESIN COMPOSITION

(71) Applicant: LG CHEM, LTD., Seoul (KR)

(72) Inventors: Su Kyoung Lee, Daejeon (KR); Min Ji Kim, Daejeon (KR); Ryul Lee, Daejeon (KR); Sung Ho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/655,007

(22) PCT Filed: Dec. 4, 2014

(86) PCT No.: PCT/KR2014/011827
§ 371 (c)(1),
(2) Date: Jun. 23, 2015

(87) PCT Pub. No.: WO2015/084072
PCT Pub. Date: Jun. 11, 2015

(65) Prior Publication Data
US 2015/0353727 A1    Dec. 10, 2015

(30) Foreign Application Priority Data

Dec. 6, 2013 (KR) .................. 10-2013-0151850

(51) Int. Cl.
| | |
|---|---|
| *C08L 33/08* | (2006.01) |
| *C08J 5/00* | (2006.01) |
| *C08L 33/04* | (2006.01) |
| *C08L 69/00* | (2006.01) |
| *C08L 83/04* | (2006.01) |

(52) U.S. Cl.
CPC .................. *C08L 33/08* (2013.01); *C08J 5/00* (2013.01); *C08L 33/04* (2013.01); *C08L 69/00* (2013.01); *C08J 2369/00* (2013.01); *C08L 83/04* (2013.01); *C08L 2201/02* (2013.01); *C08L 2201/10* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 5,447,989 | A * | 9/1995 | Mylonakis | C08L 69/00 525/461 |
| 5,910,562 | A * | 6/1999 | Miura | C08G 64/1608 528/196 |
| 6,197,857 | B1 * | 3/2001 | Nodera | C08L 51/04 524/140 |
| 2009/0118406 | A1 | 5/2009 | Tomoda | |
| 2010/0157217 | A1 | 6/2010 | Kim et al. | |
| 2012/0172504 | A1 | 7/2012 | Chin et al. | |
| 2013/0131271 | A1 * | 5/2013 | Yokogi | C08G 64/0208 525/185 |
| 2014/0186602 | A1 * | 7/2014 | Chi | C08G 64/06 428/220 |

FOREIGN PATENT DOCUMENTS

| | | |
|---|---|---|
| CN | 101747613 A | 6/2010 |
| CN | 103003361 A | 3/2013 |
| JP | 2006321919 A1 | 11/2006 |
| JP | 2011-168705 A | 9/2011 |
| JP | 2012-214666 A | 11/2012 |
| KR | 10-2008-0061310 A1 | 7/2008 |
| KR | 10-2010-0071486 A | 6/2010 |
| KR | 10-2012-0078572 A1 | 7/2012 |
| KR | 10-2013-0078790 A | 7/2013 |

* cited by examiner

*Primary Examiner* — Robert C Boyle
(74) *Attorney, Agent, or Firm* — Dentons US LLP

(57) ABSTRACT

The present invention relates to a polycarbonate resin composition including both of silicone oil and olefin-based wax at a proper ratio and thus having improved dispersibility of titanium dioxide in the composition as well as high impact strength and melt index (moldability), and also relates to a polycarbonate molded article made of the polycarbonate resin composition. The polycarbonate resin composition according to the present invention includes silicone oil and olefin-based wax at a proper ratio and thus improves dispersibility of titanium dioxide which is added to the composition to give whiteness, while preserving high impact strength and melt index (moldability), so that crawling which is generated on the surface of a final product of polycarbonate molded article is prevented and the appearance property of the molded article is improved. Therefore, the polycarbonate resin composition according to the present invention has characteristics of high whiteness as well as high impact strength and melt index (moldability), and thus is easily applicable to industries in need of the polycarbonate resin.

15 Claims, No Drawings

POLYCARBONATE RESIN COMPOSITION

This application is a National Stage Entry of International Application No. PCT/KR2014/011827, filed on Dec. 4, 2014, and claims the benefit of Korean Application No. 10-2013-0151850, filed on Dec. 6, 2013, all of which are hereby incorporated by reference in their entirety for all purposes as it fully set forth herein.

TECHNICAL FIELD

The present invention relates to a polycarbonate resin composition including both of silicone oil and olefin-based wax at a proper ratio and thus having improved dispersibility of titanium dioxide in the composition as well as high impact strength and melt index (moldability), and also relates to a polycarbonate molded article made of the polycarbonate resin composition.

BACKGROUND ART

Generally, a polycarbonate resin has relatively excellent impact resistance, heat resistance, self-extinguishability, and transparency as compared with other resins, and thus is extensively used for manufacturing compact discs, transparent sheets, packing materials, car bumpers, ultraviolet-proof films, and components of electronic devices, and the like. Also, demands for the polycarbonate resin are rapidly increasing.

Particularly, in the field of components of electronic devices, when the polycarbonate resin is used for a backlight unit of a liquid crystal display (LCD), it should have high light-reflective property, whiteness, and color, and high fluidity is required together with compactness and thinness of molded articles such as televisions, monitors, or laptops.

When a polycarbonate resin is used for a backlight unit of an LCD, a high white-colored resin is used for a backlight frame to reflect light while the loss of backlight is being minimized. To this end, titanium dioxide is mainly used as a white pigment.

However, a high content of titanium dioxide should be used in order to realize high whiteness of the resin, and thus mechanical properties of the resultant resin may be somewhat deteriorated. Therefore, a development of a polycarbonate resin having good mechanical properties as well as high whiteness is required.

With the aforementioned background, while studying a polycarbonate resin having good surface characteristics as well as high impact strength and melt index (moldability), the present inventors found that a polycarbonate resin prepared using a polycarbonate resin composition in which a polycarbonate resin, a core-shell structured acrylic-based impact modifier, titanium dioxide, silicone oil, and olefin-based wax were mixed at a proper ratio, had a remarkably good appearance property as well as high impact strength and melt index (moldability), and therefore completed the present invention.

DISCLOSURE OF THE INVENTION

Technical Problem

It is an object of the present invention to provide a polycarbonate resin composition including both of silicone oil and olefin-based wax at a proper ratio and thus having improved dispersibility of titanium dioxide in the composition as well as high impact strength and melt index (moldability).

It is another object of the present invention to provide a polycarbonate molded article made of the polycarbonate resin composition.

Technical Solution

According to an embodiment of the present invention, there is provided a polycarbonate resin composition including a) 70 to 95 parts by weight of a polycarbonate resin; b) 1 to 10 parts by weight of a core-shell structured acrylic-based impact modifier; c) 0.1 to 5 parts by weight of silicone oil; d) 0.1 to 3 parts by weight of olefin-based wax; and 1 to 5 parts by weight of titanium dioxide.

Also, according to another embodiment of the present invention, there is provided a polycarbonate molded article made of the polycarbonate resin composition.

Advantageous Effects

A polycarbonate resin composition according to the present invention includes silicone oil and olefin-based wax at a proper ratio, and thus improves dispersibility of titanium dioxide which is added to the composition to give whiteness, while preserving high impact strength and melt index (moldability), so that crawling which is generated on the surface of a final product of polycarbonate molded article is prevented and the appearance property of the molded article is improved.

Therefore, the polycarbonate resin composition according to the present invention has characteristics of high whiteness as well as high impact strength and melt index (moldability), and thus is easily applicable to industries in need of the polycarbonate resin.

MODE FOR CARRYING OUT THE INVENTION

Hereinafter, the present invention will be described in more detail to facilitate understanding of the present invention.

Terms or words used in the description and claims should not be restrictively interpreted as ordinary or dictionary meanings, but should be interpreted as meanings and concepts conforming to the inventive concept on the basis of a principle that an inventor can properly define the concept of a term to explain his or her own invention in the best ways.

According to an embodiment of the present invention, a polycarbonate resin composition is provided, which improves dispersibility of titanium dioxide in the composition while preserving high impact strength and melt index (moldability) and thus prevents crawling, so that the appearance property of the resultant molded article can be improved.

Generally, a polycarbonate resin has relatively excellent impact resistance, heat resistance, self-extinguishability, and transparency, and thus is extensively used for components of electronic devices as well as compact discs, transparent sheets, and packing materials, and particularly for a backlight unit of a liquid crystal display.

However, in order to use the polycarbonate resin for a backlight unit of a liquid crystal display, the polycarbonate resin should be colored with a white pigment for high whiteness. Thus, titanium dioxide is added to increase whiteness of the polycarbonate resin, but a large amount of titanium dioxide is required for high whiteness. When the polycarbonate resin contains an excess amount of titanium dioxide, mechanical properties thereof are deteriorated and dispersibility of titanium dioxide is also reduced, and thus surface characteristics of the resultant resin become worse. Therefore, a development of a polycarbonate resin having good mechanical properties and appearance property as well as high whiteness is required.

To meet such a requirement, the present invention provides a polycarbonate resin composition in which a polycarbonate resin, a core-shell structured acrylic-based impact modifier, titanium dioxide, silicone oil, and olefin-based wax are mixed at a proper ratio, having a remarkably improved appearance property as well as high impact strength and melt index (moldability).

A polycarbonate resin composition according to an embodiment of the present invention includes a) 70 to 95 parts by weight of the polycarbonate resin; b) 1 to 10 parts by weight of the core-shell structured acrylic-based impact modifier; c) 0.1 to 5 parts by weight of the silicone oil; d) 0.1 to 3 parts by weight of the olefin-based wax; and 1 to 5 parts by weight of the titanium dioxide.

The polycarbonate resin in a) is not particularly limited, but any material which is prepared through a method known in the art or any commercially available material may be used.

For example, the polycarbonate resin may be prepared by reacting a diphenol compound with a phosgene compound, a halogen acid ester compound, a carbonic acid ester compound, or combinations thereof.

The diphenol compound may be, but is not particularly limited to, for example 4,4'-dihydroxydiphenyl, 2,2-bis-(4-hydroxyphenyl)-propane, 2,4-bis(4-hydroxyphenyl)-2-methylbutane, 1,1-bis-(4-hydroxyphenyl)-cyclohexane, 2,2-bis-(3-chloro-4-hydroxyphenyl)-propane, or 2,2-bis-(3,5-dichloro-4-hydroxyphenyl)-propane, and preferably may be 2,2-bis-(4-hydroxyphenyl)-propane as bisphenol-A.

The polycarbonate resin according to an embodiment of the present invention may have a weight-average molecular weight of 10,000 to 200,000, and preferably 40,000 to 80,000.

If the polycarbonate resin has a weight-average molecular weight out of the above range, moldability and kneadability of a polycarbonate resin composition including such a polycarbonate resin may be deteriorated.

Also, the polycarbonate resin may have low fluidity with a low melt index (MI), and may be only one kind of polycarbonate resin or a mixture of two or more polycarbonate resins having different melt indices. The polycarbonate resin may preferably be a mixture of two or more polycarbonate resins having different melt indices.

Specifically, the polycarbonate resin may be one or a mixture of two of more selected from resins having a melt index (MI) of 10 g/10 min, 22 g/10 min, or 30 g/10 min at the temperature of 300° C. and under the load of 1.2 kg according to ASTM D1238. The polycarbonate resin may preferably be a mixture of a polycarbonate resin having a melt index of 22 g/10 min and a polycarbonate resin having a melt index of 30 g/10 min.

When the polycarbonate resin is a mixture of two or more polycarbonate resins having different melt indices, the polycarbonate resin may be a mixture in which a polycarbonate resin having a relatively high melt index and a polycarbonate resin having a relatively low melt index are mixed at a weight ratio of 7:3 to 6:4.

The polycarbonate resin may be included in an amount of 70 to 95 parts by weight. If the amount of the polycarbonate resin is out of the above range, physical properties such as impact resistance and kneadability may be deteriorated.

The core-shell structured acrylic-based impact modifier according to an embodiment of the present invention may be a graft copolymer in which a shell including an acrylic-based monomer is formed on a rubbery core. The core-shell structured acrylic-based impact modifier may have a particle size of 100 nm to 400 nm. When the core-shell structured acrylic-based impact modifier has a particle size within the above range, stiffness of a polycarbonate resin composition including the impact modifier may not be deteriorated, and a molded article made of the polycarbonate resin composition may have a good appearance property while preserving proper impact strength.

The core-shell structured acrylic-based impact modifier may be included in an amount of 1 to 10 parts by weight.

The core-shell structured acrylic-based impact modifier may be at least one selected from the group consisting of an acrylic-methylmethacrylate copolymer and a silicone-acrylic based copolymer.

When the core-shell structured acrylic-based impact modifier is an acrylic-alkyl methacrylate copolymer, the impact modifier may include 60 wt % to 90 wt % of an acrylic-based rubbery core including an acrylate monomer, and 10 wt % to 40 wt % of a shell which contains an alkyl methacrylate monomer and is formed on the core.

Meanwhile, the acrylic-alkyl (meth)acrylate copolymer is not particularly limited, but any material which is prepared by a method ordinarily known in the art or any commercially available material may be used.

For example, the acrylic-alkyl (meth)acrylate copolymer may be prepared in such a way that an acrylic-based rubbery core is prepared, and then a shell including an alkyl (meth)acrylate monomer is graft-copolymerized on the prepared acrylic-based rubbery core.

The acrylic-based rubbery core may be prepared in such a way that additives such as an ion exchange water, an emulsifier, a polymerization initiator, an electrolyte, and a molecular weight regulator are added to an acrylate monomer to cause a reaction.

Specifically, it may be performed by a method which includes: adding the acrylate monomer and 70 to 120 parts by weight of the ion exchange water, 0.2 to 2.5 parts by weight of the emulsifier, 0.1 to 1.5 parts by weight of the polymerization initiator, 0.5 to 2 parts by weight of the electrolyte, and 0.1 to 1 parts by weight of the molecular weight regulator, based on the 100 parts by weight of the acrylate monomer, into a polymerization reactor altogether; and causing a reaction in a temperature range of 50° C. to 90° C. In this case, the acrylate monomer may be added together with other ingredients or additives to cause a reaction, or split-added several times or continuously added during polymerization.

Examples of the acrylate monomer may include methyl acrylate, ethyl acrylate, n-propyl acrylate, n-butyl acrylate, hexyl acrylate, and 2-ethylhexyl acrylate.

The emulsifier may be, but is not particularly limited to, for example one or combinations of two or more selected from the group consisting of alkyl aryl sulfonate, alkali methyl alkyl sulfate, sulfonated alkylester, fatty acid soap, and alkali salts of rosin acids.

The polymerization initiator may be added as, but is not particularly limited to, either a water soluble persulfate-based polymerization initiator (for example, potassium persulfate, sodium persulfate, or ammonium persulfate) or a redox-based polymerization initiator including, as an ingredient, peroxide (for example, hydrogen peroxide, cumene hydroperoxide, diisopropylbenzene hydroperoxide, tert-butyl hydroperoxide, or paramenthane hydroperoxide), or a mixture thereof.

The electrolyte may be, but is not particularly limited to, at least one selected from the group consisting of potassium chloride, sodium chloride, potassium bicarbonate, sodium carbonate, potassium carbonate, potassium hydrogensulfite, sodium hydrogensulfite, tetrapotassium pyrophosphate, tetrasodium pyrophosphate tripotassium phosphate, trisodium phosphate, dipotassium hydrogenphosphate, and disodium hydrogenphosphate.

The molecular weight regulator may be, but is not particularly limited to, a kind of a typically known material such as mercaptan, and preferably tert-dodecyl mercaptane.

The shell including the alkyl (meth)acrylate monomer may be formed on the acrylic-based rubbery core in such a way that the alkyl (meth)acrylate monomer and additives such as an emulsifier, a polymerization initiator, and a molecular weight regulator are added to the prepared acrylic-based rubbery core and then the shell is graft-copolymerized. The additives such as the emulsifier, the polymerization initiator, and the molecular weight regulator may be the same as or included in the aforementioned materials.

When the core-shell structured acrylic-based impact modifier is the silicone-acrylic based copolymer, the impact modifier may include 60 wt % to 90 wt % of a silicone-based rubbery core, and 10 wt % to 40 wt % of a shell which contains an alkyl methacrylate monomer and is formed on the core. In this case, the silicone-based rubbery core may be a single rubbery core including a silicone monomer or a complex rubbery core including a silicone monomer and an acrylate monomer.

Meanwhile, the silicone-acrylic based copolymer is not particularly limited, but any material which is prepared by a method ordinarily known in the art or any commercially available material may be used.

For example, the silicone-acrylic based copolymer may be prepared in such a way that a silicone-based rubbery core is prepared, and then a shell including an alkyl (meth) acrylate monomer is graft-copolymerized on the prepared silicone-based rubbery core.

As mentioned above, the silicone-based rubbery core may be a single rubbery core including a silicone monomer, or a complex rubbery core including a silicone monomer and an acrylate monomer.

Although not particularly limited, the single rubbery core including the silicone monomer may be prepared in such a way that additives such as ion exchange water, an emulsifier, a polymerization initiator, an electrolyte, and a molecular weight regulator are added to the silicone monomer to cause a reaction.

Specifically, it may be performed by a method which includes: adding the silicone monomer and 70 to 120 parts by weight of the ion exchange water, 0.2 to 2.5 parts by weight of the emulsifier, 0.1 to 1.5 parts by weight of the polymerization initiator, 0.5 to 2 parts by weight of the electrolyte, and 0.1 to 1 parts by weight of the molecular weight regulator, based on the 100 parts by weight of the silicone monomer, into a polymerization reactor altogether; and causing a reaction in a temperature range of 50° C. to 90° C. In this case, the silicone monomer may be added together with other ingredients or additives to cause a reaction, or split-added several times or continuously added during polymerization.

The silicone monomer may be at least one selected from the group consisting of hexamethylcyclotrisiloxane, octamethylcyclotetrasiloxane, decamethylcycloheptasiloxane, dodecamethylcyclohexasiloxane, trimethyltriphenylcyclotrisiloxane, tetramethyltetraphenylcyclotetrasiloxane, and octaphenylcyclotetrasiloxane.

The additives such as the emulsifier, the polymerization initiator, the electrolyte, and the molecular weight regulator, which are used in preparing the silicone rubbery core, may be the same as or included in the aforementioned materials.

Also, although not particularly limited, the complex rubbery core including the silicone monomer and the acrylate monomer may be prepared in such a way that additives such as an ion exchange water, an emulsifier, a polymerization initiator, an electrolyte, and a molecular weight regulator are added to the silicone monomer and the acrylate monomer to cause a reaction, wherein the emulsifier, the polymerization initiator, the electrolyte, and the molecular weight regulator may be the same as or included in the aforementioned materials.

Specifically, it may be performed by a method which includes: adding the silicone monomer and the acrylate monomer, and 70 to 120 parts by weight of the ion exchange water, 0.2 to 2.5 parts by weight of the emulsifier, 0.1 to 1.5 parts by weight of the polymerization initiator, 0.5 to 2 parts by weight of the electrolyte, and 0.1 to 1 parts by weight of the molecular weight regulator, based on the 100 parts by weight of the silicone monomer and the acrylate monomer, into a polymerization reactor altogether and causing a reaction in a temperature range of 50° C. to 90° C. In this case, the silicone monomer and the acrylate monomer may be added together with other ingredients or additives to cause a reaction, or split-added several times or continuously added during polymerization.

Also, the complex rubbery core including the silicone monomer and the acrylate monomer may include the silicone monomer and the acrylate monomer which are in the form of a silicone polymer and an acrylic-based polymer polymerized from a silicone monomer and an acrylate monomer, respectively. Each of the silicone polymer and the acrylate polymer is not particularly limited, but may be prepared by a method ordinarily known in the art.

The silicone monomer, the acrylate monomer, and the additives are the same as or included in the aforementioned materials.

The shell including the alkyl (meth)acrylate monomer may be formed on the silicone-based rubbery core shell in such a way that the alkyl (meth)acrylate monomer and additives such as an emulsifier, a polymerization initiator, and a molecular weight regulator are added to the prepared silicone-based rubbery core and then the shell is graft-copolymerized. The alkyl (meth)acrylate monomer and the additives such as the emulsifier, the polymerization initiator, and the molecular weight regulator may be the same as or included in the aforementioned materials.

The silicone oil according to an embodiment of the present invention may allow titanium dioxide, which will be described later, to be homogeneously dispersed in the composition. Accordingly, dispersibility of the titanium dioxide is improved, so that when a molded article is made of the polycarbonate resin composition including the titanium dioxide according to the present invention, crawling of the titanium dioxide on the surface of the molded article is prevented and thus the appearance property of the molded article can be improved.

The silicone oil may have viscosity of 5 mm$^2$/s to 40 mm$^2$/s at 25° C., and preferably 10 mm$^2$/s to 35 mm$^2$/s. When the silicone oil has viscosity within the above range, it is advantageous in that formability of the polycarbonate resin composition including the silicone oil may be improved.

Furthermore, the silicone oil may have a melting point of 30° C. to 70° C., and preferably 35° C. to 65° C. When the silicone oil has a melting point within the above range, it is advantageous in that formability of the polycarbonate resin composition including the silicone oil may be improved, and defects in the appearance of a final molded article made of the polycarbonate resin composition may be reduced.

The silicone oil may be at least one selected from the group consisting of dimethylpolysiloxane, diphenylpolysiloxane, methylphenylpolysiloxane, methylhydrogenpolysiloxane, methacryl modified polysiloxane, phenol modified polysiloxane, amino modified polysiloxane, epoxy modified polysiloxane, carboxy modified polysiloxane, carbinol modified polysiloxane, fatty acid ester modified polysiloxane, heterogeneity-functional group modified polysiloxane, and alkoxy modified polysiloxane, and preferably may be methyphenylpolysiloxane (methylphenylsilicone oil).

The silicone oil may be included in an amount of 0.1 to 5 parts by weight, and preferably 0.5 to 3 parts by weight.

The olefin-based wax according to an embodiment of the present invention is a polymer having low melt viscosity and an oily solid having slipperiness and plasticity. The olefin-based wax may be included as an ingredient of the polycarbonate resin composition and serve to maintain good releasability and fluidity of the composition. The olefin-based wax may be at least one selected from the group consisting of polyethylene wax and polypropylene wax.

The polycarbonate resin composition may include the silicone oil and the olefin-based wax at a weight ratio of 1:1 to 5:1.

The titanium dioxide according to an embodiment of the present invention may use typical titanium dioxide, but preferably use rutile type titanium dioxide prepared from ore by hydrochloric acid leaching and having a core and an inorganic coating layer treated with an inorganic surface treating agent, an organic coating layer treated with an organic surface treating agent, or an organic/inorganic coating layer treated with organic/inorganic agents on the core.

Generally, as a difference between refractive indices of titanium dioxide which is a white-colored pigment and a polycarbonate resin which is a matrix polymer is larger, a light shielding effect becomes greater. Accordingly, decomposition degree of the polycarbonate resin is lessened and thus degradation of impact strength can be prevented.

The polycarbonate resin composition may further include other additives in addition to the above active ingredients. The additives are not particularly limited to, but may employ an antioxidant, a chemical-resistant additive, a surfactant, a nucleating agent, a coupling agent, a filler, a plasticizer, an antimicrobial agent, a thermal stabilizer, a photostabilizer, a compatibilizer, an inorganic additive, a stabilizer, an antistatic agent, a lubricant, or a flame retardant.

Also, the present invention provides a polycarbonate molded article made of the polycarbonate resin composition.

The molded article according to an embodiment of the present invention is not particularly limited, but may be prepared by a method ordinarily known in the art. For example, the molded article may be prepared in the shape of a pellet via melt extrusion of the polycarbonate resin composition in an extruder, or prepared by a variety of processes such as injection molding, blow molding, extrusion molding, or thermoforming.

Hereinafter, the present invention will be described in more detail with reference to Examples and Experimental Example below. However, Examples and Experimental Example below are intended to exemplify the present invention, and the scope of the present invention should not be limited thereto.

EXAMPLE 1

73 parts by weight of a polycarbonate resin having a melt index of 22 g/10 min, 20 parts by weight of a polycarbonate resin having a melt index of 30 g/10 min, 5 parts by weight of an acryl-methylmethacrylate impact modifier (GA0306, GANZ), 1 part by weight of methylphenylpolysiloxane (KF-50, Shinetsu, Japan), 1 part by weight of olefin-based wax (HW405MP, Mitsubishi Rayon, Japan), and 4 parts by weight of titanium dioxide (Kronos 2233, Krones) were mixed, and then the resultant mixture was melt-extruded to prepare a polycarbonate resin sample.

EXAMPLE 2

A polycarbonate resin sample was prepared through the same method as Example 1 except that 3 parts by weight of methylphenylpolysiloxane was added.

EXAMPLE 3

A polycarbonate resin sample was prepared through the same method as Example 1 except that 5 parts by weight of methylphenylpolysiloxane was added.

EXAMPLE 4

A polycarbonate resin sample was prepared through the same method as Example 1 except that 5 parts by weight of a silicone-acrylic based impact modifier was added instead of the acrylic-methylmethacrylate impact modifier.

EXAMPLE 5

A polycarbonate resin sample was prepared through the same method as Example 1 except that 7 parts by weight of an acryl-methylmethacrylate impact modifier was added.

EXAMPLE 6

A polycarbonate resin sample was prepared through the same method as Example 1 except that 20 parts by weight of a polycarbonate resin having a melt index of 10 g/10 min was added instead of the polycarbonate resin having a melt index of 30 g/10 min.

COMPARATIVE EXAMPLE 1

A polycarbonate resin sample was prepared through the same method as Example 1 except that the methylphenylpolysiloxane was not added and 1 part by weight of an ester-based lubricant was added instead of the olefin-based wax.

COMPARATIVE EXAMPLE 2

A polycarbonate resin sample was prepared through the same method as Example 1 except that 10 parts by weight of methylphenylpolysiloxane was added and 1 part by weight of an ester-based lubricant (EP184, Hanyanghwasung Co., Korea) was added instead of the olefin-based wax.

COMPARATIVE EXAMPLE 3

A polycarbonate resin sample was prepared through the same method as Example 1 except that 2 parts by weight of phenyltrimethicone (SF1550, Momentive) was added instead of the methylphenylpolysiloxane and 1 part by weight of an ester-based lubricant was added instead of the olefin-based wax.

EXPERIMENTAL EXAMPLE

In order to compare and analyze properties of each of the polycarbonate resin samples prepared in the above Examples and Comparative Examples, impact strengths, melt indices, and appearance properties were measured by the following methods. The results are shown in Table 1 below.

(1) Impact Strength
Impact strength of each sample was measured according to ASTM D256.

(2) Melt Index
Each sample was melted for 10 minutes at the temperature of 300° C. and under the load of 1.2 kg, and then the weight (g) of each resultant resin was measured according to ASTM D1238.

(3) Appearance Property
The circular surfaces of injection molded articles having a high gloss were measured using optical microscope.

TABLE 1

| Item | Impact strength (kg · cm/cm$^2$) | Melt index (g/10 min) | Appearance property |
|---|---|---|---|
| Example 1 | 55 | 24 | 1 |
| Example 2 | 57 | 25 | 2 |
| Example 3 | 60 | 27 | 2 |
| Example 4 | 57 | 23 | 2 |
| Example 5 | 65 | 25 | 1 |
| Example 6 | 58 | 18 | 2 |
| Comparative Example 1 | 55 | 24 | 4 |
| Comparative Example 2 | 61 | 30 | 4 |
| Comparative Example 3 | 52 | 25 | 5 |

As shown in Table 1 above, it was found that the polycarbonate resins in Examples 1 to 6 according to the present invention in which both of silicone oil and olefin-based wax were included had similar or slightly better impact strengths and melt indices (moldability) and also significantly better appearance properties than the polycarbonate resins in Comparative Examples in which the silicone oil and the olefin-based wax were not included (Comparative Examples 1 and 3) or an excess amount of the silicone oil was included (Comparative Example 2).

These results demonstrate that the polycarbonate resin composition according to the present invention includes the silicone oil and the olefin-based wax at a proper ratio and thus improves dispersibility of titanium dioxide, so that crawling on the surface of a final product of molded article can be prevented and the molded article can have an improved appearance property as well as high impact strength and melt index (moldability).

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A polycarbonate resin composition, comprising:
   a) 70 to 95 parts by weight of a polycarbonate resin;
   b) 1 to 10 parts by weight of a core-shell structured acrylic-based impact modifier;
   c) 1 to 5 parts by weight of silicone oil;
   d) 1 to 3 parts by weight of olefin-based wax; and
   e) 1 to 5 parts by weight of titanium dioxide,
   wherein the silicone oil and the olefin-based wax are included at a weight ratio of 1:1 to 5:1, and
   wherein the polycarbonate resin is a mixture of two or more selected from resins having a melt index (MI) of 10 g/10 min, 22 g/10 min, or 30 g/10 min at 300° C. and under a load of 1.2 kg.

2. The polycarbonate resin composition of claim 1, wherein the polycarbonate resin in a) comprises a linear polycarbonate resin.

3. The polycarbonate resin composition of claim 1, wherein the core-shell structured acrylic-based impact modifier has a particle size of 100 nm to 400 nm.

4. The polycarbonate resin composition of claim 1, wherein the acrylic-based impact modifier is at least one selected from the group consisting of an acrylic-alkyl (meth)acrylate copolymer and a silicone-acrylic based copolymer.

5. The polycarbonate resin composition of claim 4, wherein the acrylic-alkyl (meth)acrylate copolymer comprises:
   60 wt % to 90 wt % of a rubbery core including an acrylate monomer; and
   10 wt % to 40 wt % of a shell which contains an alkyl (meth)acrylate-based monomer and is formed on the core.

6. The polycarbonate resin composition of claim 4, wherein the silicone-acrylic based copolymer comprises:
   60 wt % to 90 wt % of a silicone-based rubbery core; and
   10 wt % to 40 wt % of a shell which contains an alkyl (meth)acrylate-based monomer and is formed on the core.

7. The polycarbonate resin composition of claim 6, wherein the silicone-based rubbery core is a single rubbery core including a silicone monomer or a rubbery core including a silicone monomer and an acrylate monomer.

8. The polycarbonate resin composition of claim 7, wherein the silicone monomer is at least one selected from the group consisting of hexamethylcyclotrisiloxane, octamethylcyclotetrasiloxane, decamethylcycloheptasiloxane, dodecamethylcyclohexasiloxane trimethyltriphenylcyclotrisiloxane, tetramethyltetraphenylcyclotetrasiloxane, and octaphenylcyclotetrasiloxane.

9. The polycarbonate resin composition of claim 5, wherein the acrylate monomer is at least one selected from the group consisting of methyl acrylate, ethyl acrylate, n-propyl acrylate, n-butyl acrylate, hexyl acrylate, and 2-ethylhexyl acrylate.

10. The polycarbonate resin composition of claim 5, wherein the alkyl (meth)acrylate monomer is at least one selected from the group consisting of ethyl acrylate, propyl acrylate, isopropyl acrylate, butyl acrylate, hexyl acrylate, octyl acrylate, 2-ethylhexyl acrylate, ethyl methacrylate, propyl methacrylate, isopropyl methacrylate, butyl methacrylate, hexyl methacrylate, octyl methacrylate, and 2-ethylhexyl methacrylate.

11. The polycarbonate resin composition of claim 1, wherein the silicone oil is at least one selected from the group consisting of dimethylpolysiloxane, diphenylpolysiloxane, methylphenylpolysiloxane, methylhydrogenpolysiloxane, methacryl modified polysiloxane, phenol modified polysiloxane, amino modified polysiloxane, epoxy modified polysiloxane, carboxy modified polysiloxane, carbinol modified polysiloxane, fatty acid ester modified polysiloxane, and alkoxy modified polysiloxane.

12. The polycarbonate resin composition of claim 1, wherein the silicone oil is methylphenylpolysiloxane.

13. The polycarbonate resin composition of claim 1, wherein the silicone oil has viscosity of 5 mm$^2$/s to 40 mm$^2$/s at 25° C.

14. The polycarbonate resin composition of claim 1, wherein the olefin-based wax is at least one selected from the group consisting of polyethylene wax and polypropylene wax.

15. A polycarbonate resin molded article made of the polycarbonate resin composition of claim 1.

* * * * *